United States Patent
Morishita

(10) Patent No.: US 7,235,944 B2
(45) Date of Patent: Jun. 26, 2007

(54) WIPER CONTROL SYSTEM

(75) Inventor: Taiji Morishita, Kariya (JP)

(73) Assignee: Denso Corporation, Kariya (JP)

( * ) Notice: Subject to any disclaimer, the term of this patent is extended or adjusted under 35 U.S.C. 154(b) by 94 days.

(21) Appl. No.: 11/172,923

(22) Filed: Jul. 5, 2005

(65) Prior Publication Data
US 2006/0006826 A1   Jan. 12, 2006

(30) Foreign Application Priority Data
Jul. 7, 2004   (JP) .............................. 2004-200989

(51) Int. Cl.
*G05B 5/00* (2006.01)
(52) U.S. Cl. ...................... 318/483; 318/466; 318/467; 318/468; 318/445; 318/480
(58) Field of Classification Search ................ 318/483, 318/466, 467, 468; 388/933, 929; 312/DIG. 2, 312/445, 456, 480, 482
See application file for complete search history.

(56) References Cited

U.S. PATENT DOCUMENTS 5,847,826 A * 12/1998 Fukui et al. ................ 356/335
6,617,813 B2    9/2003 Morishita et al.
6,657,410 B1   12/2003 Berger et al.

FOREIGN PATENT DOCUMENTS

| DE | 4341844 A1 | 8/1994 |
|---|---|---|
| JP | 2-220948 | 9/1990 |
| JP | 6-344867 | 12/1994 |

OTHER PUBLICATIONS

EPO Search Report—Feb. 23, 2006.

* cited by examiner

*Primary Examiner*—Karen Masih
(74) *Attorney, Agent, or Firm*—Nixon & Vanderhye P.C.

(57) ABSTRACT

A wiper control system for detecting an amount of raindrops landed on a windshield of a vehicle and driving a wipe operation of a wiper to wipe the landed raindrops. The wiper control system includes raindrop sensing means, average landed raindrop amount calculation means, vehicle acceleration sensing means, and wipe operation mode selection means. The raindrop sensing means is capable of detecting the amount of landed raindrops for each of a plurality of wipe cycles of the wiper. The average landed raindrop amount calculation means calculates an average value of the amount of landed raindrops for the plurality of wipe cycles. The vehicle acceleration sensing means detects an acceleration of the vehicle. The wipe operation mode selection means selects a wipe operation mode based on the acceleration of the vehicle and any one of the amount of landed raindrops and the average amount of landed raindrops.

16 Claims, 8 Drawing Sheets

WIPER CONTROL SYSTEM

CROSS REFERENCE TO RELATED APPLICATIONS

This application is based upon and claims the benefit of priority of Japanese Patent Application No. 2004-200989, filed on Jul. 7, 2004, the contents of which are incorporated herein by reference.

FIELD OF THE INVENTION

The present invention relates to a wiper control system and, more particularly, a wiper control system for automatically wiping raindrops landed on a windshield of a vehicle.

BACKGROUND OF THE INVENTION

A conventional wiper control system selects a wiping interval related to a wiping speed of a wiper and a wipe mode preset to a predetermined speed range. For example, an intermittent operation mode, a low-speed operation mode, and a high-speed operation mode. The selection is made in accordance with the amount of raindrops landed on a windshield so as to control a wipe operation of the wiper. This type of wiper control system includes a raindrop sensor for detecting the amount of raindrops landed on, for example, a windshield. The raindrop sensor is provided so as not to impair the visibility of a driver. As a result, a raindrop detection area is limited so as to be likely to generate fluctuations in the amount of landed raindrops measured by the raindrop sensor as compared with the amount of raindrops in actual rainfall. Therefore, it is necessary to stabilize the wipe operation.

On the other hand, in a technique disclosed in Japanese Patent Laid-Open Publication No. 2003-160026, the amount of landed raindrops is detected for each wipe cycle. Then, a wipe mode is selected based on an average amount of landed raindrops obtained by averaging the amounts of landed raindrops for a plurality of wipe cycles (hereinafter, referred to as a plurality of samples). If rainfall changes, the number of samples used for averaging is reduced. The reduction of the number of samples also reduces time until the actual rainfall is reflected on a calculated average amount of landed raindrops. As a result of this reduction of time, the ability to adjust the wipe operation in response to a change in a rainfall state is intended to be improved.

In the case where vehicle behavior changes, for example, when the vehicle starts after a stop at red light or when the vehicle decelerates to stop at red light, there is a possibility that the amount of raindrops landed on a windshield appears to suddenly change. In a conventional wiper control system, however, relatively long time is needed so that a suddenly changed amount of landed raindrops is reflected on the amount of landed raindrops for all samples even if the number of samples is reduced. Therefore, there arises a problem that the adjustment of the wipe operation is delayed following a sudden change of the amount of landed raindrops caused by a change in vehicle behavior and the like.

Even if the rainfall has no change, the amount of raindrops landed on the windshield is likely to suddenly increase in the case where the vehicle accelerates. For example, when the vehicle starts after a stop at a red light or when the vehicle overtakes a vehicle in front or the like after running at an approximately fixed speed and the like. On the other hand, the amount of raindrops landed on the windshield is likely to suddenly decrease in the case where the vehicle decelerates. For example, when the vehicle stops at a red light and the like.

Moreover, regarding a change in vehicle behavior, there is a possibility that it becomes difficult to ensure visibility until a wiping speed of the wiper is adjusted to be suitable for the amount of landed raindrops in the case of acceleration. In deceleration, for example, there is a possibility that the wipe operation mode of the wiper is kept to maintain a relatively high wiping speed although the amount of landed raindrops decreases. Therefore, the wipe operation of the wiper seems to be troublesome to a driver.

SUMMARY OF THE INVENTION

The present invention was devised in consideration of the above-mentioned and other circumstances, and has an object of providing a wiper control system capable of improved adjustment of a wipe operation in response to a relatively sudden change in the amount of landed raindrops due to a change in vehicle behavior and the like.

A wiper control system according to one aspect of the present invention includes a wiper and driving means to form a wipe operation of the wiper by a driving force of the driving means so as to wipe a raindrop landed on a windshield. The wiper control system is for detecting an amount of raindrops landed on a wipe range of the wiper on the windshield to output a selection signal for selecting a wipe operation mode of the wiper based on the amount of landed raindrops. The wiper control system includes raindrop sensing means capable of detecting the amount of landed raindrops for each wipe cycle of the wiper; average landed raindrop amount calculation means for calculating an average value of the amounts of landed raindrops over a plurality of wipe cycles; vehicle acceleration sensing means for detecting an acceleration of a vehicle; and wipe operation mode selection means for selecting the wipe operation mode, wherein the wipe operation mode selection means selects the wipe operation mode of the wiper based on the vehicle acceleration and any one of the amount of landed raindrops and the average amount of landed raindrops.

According to the above structure, the wipe operation mode of the wiper is not selected based on, for example, the average amount of landed raindrops as in the conventional technique, but rather the vehicle acceleration as a representative value indicative of a change in vehicle behavior is also taken into consideration. Therefore, it is possible to determine whether or not there is a relatively sudden increase or decrease in the amount of landed raindrops due to a change in vehicle behavior or the like. Accordingly, since the wipe operation mode of the wiper is selected based on the vehicle acceleration and any one of the amount of landed raindrops and the average amount of landed raindrops, the ability to adjust the wipe operation in response to a sudden change in the amount of landed raindrops can be improved.

A wiper control system according to another aspect of the present invention includes determination means for determining based on the vehicle acceleration whether or not to implement the wipe operation mode selection based on the average amount of landed raindrops, wherein the wipe operation mode selection means selects the wipe operation mode based on the average amount of landed raindrops when it is determined by the determination means that the wipe operation mode selection is implemented based on the average amount of landed raindrops and the wipe operation mode selection means selects the wipe operation mode based on any one of the amount of landed raindrops and the vehicle acceleration when it is not determined that the wipe operation mode selection based on the average amount of landed raindrops is implemented.

Generally, for example, in the case where the vehicle accelerates to start after a stop at a red light or the like, the amount of landed raindrops suddenly increases. In the case where the vehicle decelerates to stop at a red light or the like, the amount of landed raindrops suddenly decreases.

In order to cope with this, in the case where the wipe operation mode selection based on the average amount of landed raindrops is implemented, the wipe operation mode is selected based on the average amount of landed raindrops after the effect of the vehicle acceleration is determined, as a procedure of selecting the wipe operation mode. As a result, it is possible to determine based on the degree of the vehicle acceleration and if the vehicle acceleration is positive or negative if the amount of raindrops landed on the windshield is transiently increased or decreased by, for example, the effect of the acceleration. Therefore, based on the result of the determination that the amount of landed raindrops is transiently increased or decreased by the vehicle acceleration, it is possible to select the wipe operation mode based on the average amount of landed raindrops.

If it is determined to suspend the implementation of the wipe operation mode selection based on the average amount of landed raindrops, the wipe operation mode is selected based on the amount of landed raindrops or the vehicle acceleration. Therefore, a control process of implementing the wipe operation mode selection based on the average amount of landed raindrops can be omitted to simplify the process, that is, to reduce processing time until the wipe operation mode is selected.

In another aspect of the present invention, the determination means includes provisional wipe operation mode selection means for selecting a provisional wipe operation mode based on the amount of landed raindrops, wherein the wipe operation mode selection means selects the provisional wipe operation mode as the wipe operation mode when the determination means does not determine the implementation of the wipe operation mode selection based on the average amount of landed raindrops.

If the determination means determines the suspension of the implementation of the wipe operation mode selection based on the average amount of landed raindrops, there is a possibility that an actual amount of increase in the amount of landed raindrops becomes relatively slightly smaller when, for example, the wipe operation mode is selected based only on the vehicle acceleration in the case where a crossing angle between a vehicle running direction and a rainfall direction of the raindrops is relatively large or the like.

In order to cope with this, it is preferable that the determination means include means which selects the provisional wipe operation mode based on the amount of landed raindrops. For example, by setting the amount of landed raindrops serving as a provisional reference for selecting the wipe operation mode in accordance with the amount of suddenly increasing or decreasing raindrops, an appropriate wipe operation mode can be selected in accordance with an actual amount of landed raindrops as compared with the case where the wipe operation mode is selected based only on the vehicle acceleration.

The determination means of the wiper control system according to yet another aspect of the present invention includes: acceleration criterion value setting means for setting an acceleration criterion value for determining the degree of acceleration or deceleration of the vehicle; and comparison means for comparing the vehicle acceleration and the acceleration criterion value with each other, wherein the acceleration criterion value setting means varies the acceleration criterion value in accordance with the vehicle speed.

Even in the case where the vehicle acceleration is relatively small so as to correspond to a subtle change in behavior, it is sometimes necessary to implement the wipe operation mode selection based on the amount of landed raindrops to improve the ability to adjust the wipe operation of the wiper depending on a running condition indicating a change in vehicle behavior, for example, a running speed of the vehicle. Moreover, in view of the senses of a driver such as ensured visibility or the troublesomeness of a wipe operation and the like, it is sometimes only necessary to ensure a certain ability for the adjustment.

In order to cope with this, it is preferred to vary the criterion value to be compared with the vehicle acceleration by the determination means in accordance with the vehicle speed. For example, at the vehicle speed at which the ability to adjust of the wipe operation of the wiper is to be improved, wiper control with a high degree of adjustability can be achieved based on the amount of landed raindrops even at a small vehicle acceleration.

A wiper control system according to yet another aspect of the present invention includes vehicle speed zone setting means for dividing the range of vehicle speed, at which the vehicle can run, into a plurality of zones, wherein the acceleration criterion value setting means includes upper acceleration limit criterion value setting means for determining whether the vehicle accelerates or not for each zone. The plurality of zones are classified at least into an extremely low speed zone in which the vehicle speed is extremely low including a stop of the vehicle and the other zones except for the extremely low speed zone, and an upper acceleration limit criterion value in the extremely low speed zone is set lower than those in the other zones.

For example, when a vehicle is started or the like, a driver should generally particularly watch out for the surroundings including pedestrians and other vehicles and the like simultaneously with the start of the vehicle.

In order to cope with this, the upper acceleration limit criterion value in the extremely low speed zone including a vehicle stop state is set lower than those in the other vehicle speed zones so as to enhance sensitivity for the adjustment of the wipe operation of the wiper. As a result, visibility can be surely ensured when the vehicle is started.

Still another wiper control system according to the present invention includes vehicle speed zone setting means for dividing the range of vehicle speed, at which the vehicle can run, into a plurality of zones, wherein the acceleration criterion value setting means includes lower acceleration limit criterion value setting means for determining for each of the zones whether the vehicle decelerates or not so that the lower acceleration limit criterion value is set lower in a zone with a higher vehicle speed.

For example, in the case where the vehicle decelerates to stop at a red light, there is a possibility that the wiping operation mode of the wiper is kept to maintain a relatively high wiping speed although the amount of landed raindrops decreases. Therefore, the wipe operation of the wiper seems to be troublesome to the driver.

Moreover, when the vehicle runs at a high speed, for example, on an expressway, the driver's field of vision tends to be narrower as compared with that in the case where the vehicle runs at a low speed. When it rains or a road surface is wet, there is a possibility that the windshield gets wet with a water splash created by a vehicle in the vicinity of the vehicle or in the opposite lane. In such a situation, visibility is required to be ensured for safety.

In order to cope with this, when the lower acceleration limit criterion value is set so as to detect that the vehicle decelerates to a certain degree, the wipe operation of the wiper is set in accordance with a decreasing amount of landed raindrops for each wipe cycle so that the wipe operation of the wiper does not seem to be troublesome to the driver.

Furthermore, the lower acceleration limit criterion value is set lower in the zone with a higher vehicle speed, so that sensitivity to the adjustment of the wipe operation of the wiper is lowered when the vehicle is running at a high speed. As a result, even if the vehicle decelerates after running at a high speed, visibility can be surely ensured because wiper control is not performed to improve the ability to adjust the wipe operation of the wiper unless the vehicle abruptly slows down.

The wiper control system according to still yet another aspect of the present invention includes wipe operation mode selection means that selects the wipe operation mode based on a change between an earlier average amount of landed raindrops and a later average amount of landed raindrops calculated in the order of wipe cycles in the case where the wipe operation mode is selected based on the average amount of landed raindrops.

Even if a single amount of landed raindrops greatly changes among the amounts of landed raindrops for a plurality of predetermined wipe cycles, a calculated average amount of landed raindrops provides an accurate determination.

In order to cope with this, the wipe operation mode is selected based on a change between the earlier average amount of landed raindrops and the later average amount of landed raindrops calculated in the order of wipe cycles, for example, a change in the current average amount of landed raindrops as compared with the previous average amount of landed raindrops. As a result, even an extremely small change (of a state of the amount of raindrops) can be surely detected so as to select an appropriate wipe operation mode. For example, even if no sudden change is observed in the previous amount of landed raindrops whereas only the latest amount of landed raindrops greatly changes among a plurality of currently averaged data, an appropriate wipe operation mode can be selected in accordance with the degree of the detected change in the average amount of landed raindrops as compared with the case where the wipe operation mode is selected based only on an absolute value of the average amount of landed raindrops.

In the wiper control system according to still yet another aspect of the present invention, the average landed raindrop amount calculation means includes storage means for storing the amounts of landed raindrops in the order of wipe cycles; and sample number setting means for setting the number of samples as a parameter for averaging the amounts of landed raindrops, wherein an average amount of landed raindrops is calculated from the latest amount of landed raindrops detected based on the number of samples and the previous amounts of landed raindrops except for the latest amount of landed raindrops.

According to the above structure, it is preferred for the average landed raindrop amount calculation means to use a moving average calculated by an averaging technique with so-called moving average as the average amount of landed raindrops. The latest amount of landed raindrops detected for each of the wipe cycles of the wiper is added to the samples while the earliest amount of landed raindrops of all the amounts of landed raindrops is deleted so as to update the samples for each of the wipe cycles as needed. By using the updated samples, the average amount of landed raindrops is calculated for each of the wipe cycles.

As a result, substantially simultaneously with the detection of the latest amount of landed raindrops, the average amount of landed raindrops can be obtained by averaging the amounts of landed raindrops including the latest amount of landed raindrops. For example, by detecting the degree of a change in the above-described average amount of landed raindrops, the amount of a sudden increase or decrease in the latest amount of landed raindrops can be surely obtained.

The wiper control system according to yet still another aspect of the present invention includes change criterion value setting means for setting a criterion value to be compared with a change in the average amount of landed raindrops for selecting the wipe operation mode; and acquisition means for acquiring switching information for switching to a change criterion value required by the driver, wherein the change criterion value setting means changes the change criterion value based on any one of the switching information and the vehicle speed.

As a result, since the change criterion value is changed based on the switching information of the change criterion value required by the driver, the most suitable wiper control can be achieved in accordance with the preference of the driver. Since the change criterion value is changed based on the vehicle speed, visibility can be ensured so that the vehicle can more safely run.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Hereinafter, embodiments, in which a wiper control system of the present invention is embodied, will be described with reference to the drawings.

Figure 1:
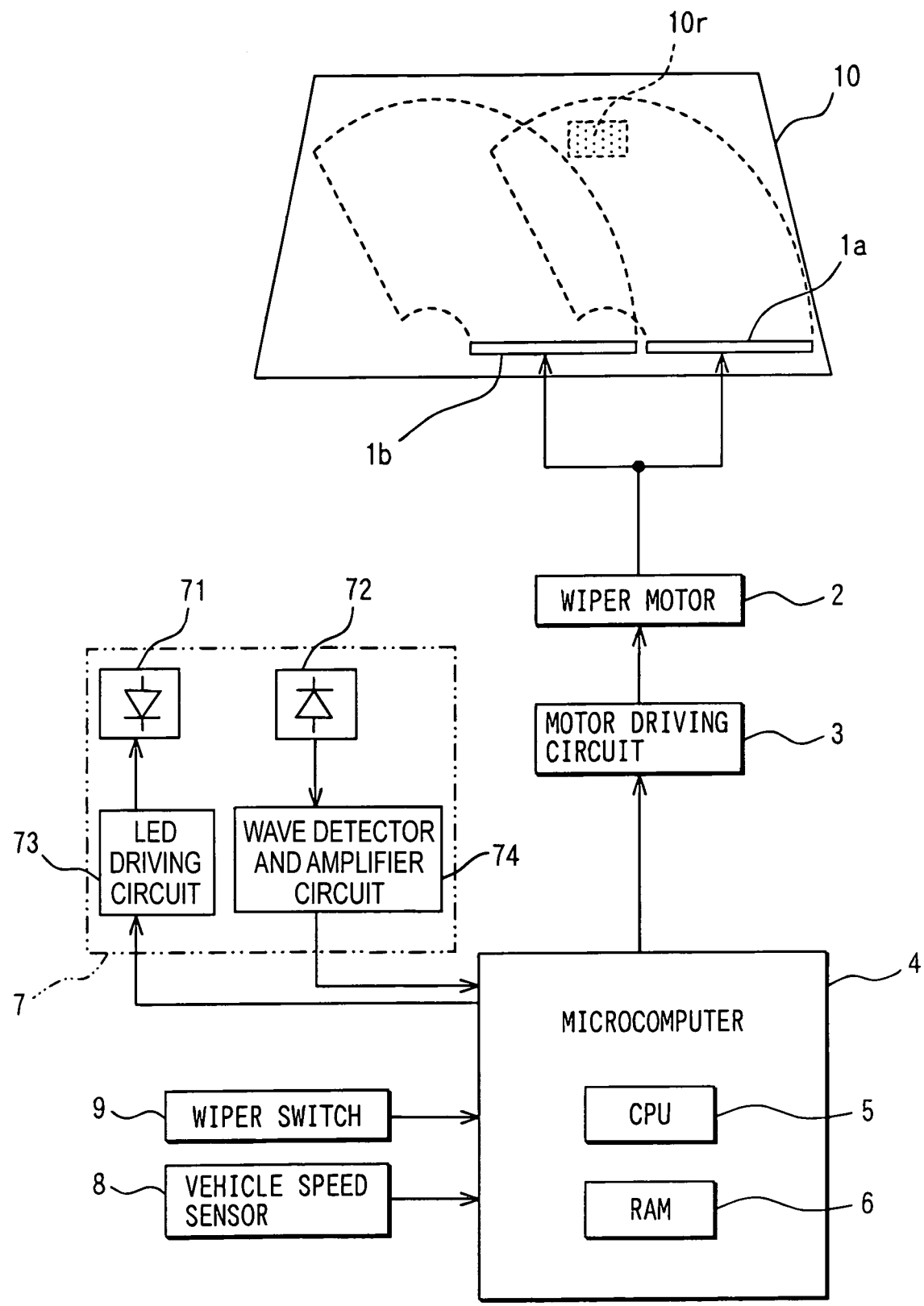
FIG. 1 is a block diagram of a wiper control system according to a first embodiment of the present invention.
Figure 2:
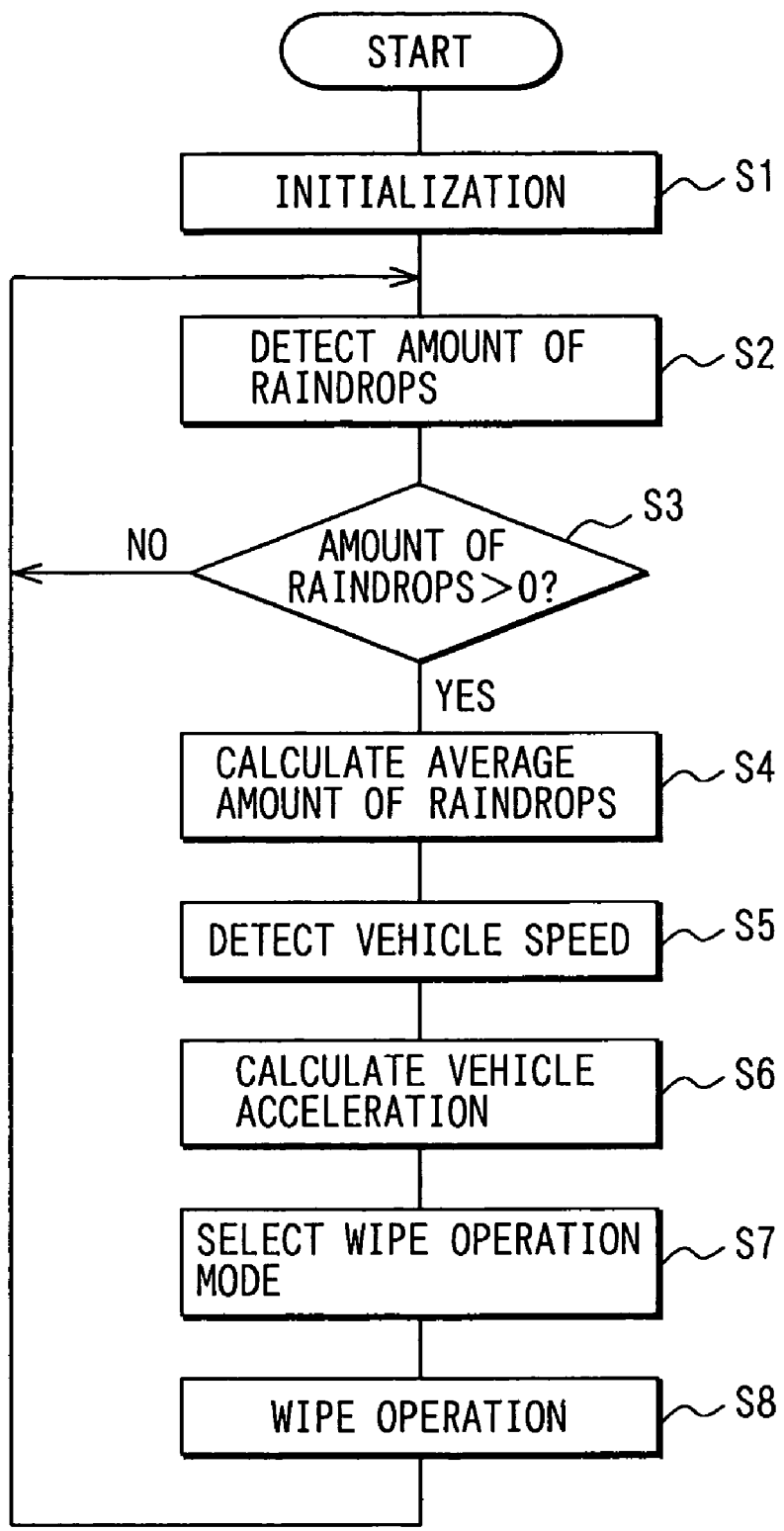
FIG. 2 is a flowchart of an operation of the wiper control system of FIG. 1.
Figure 3:
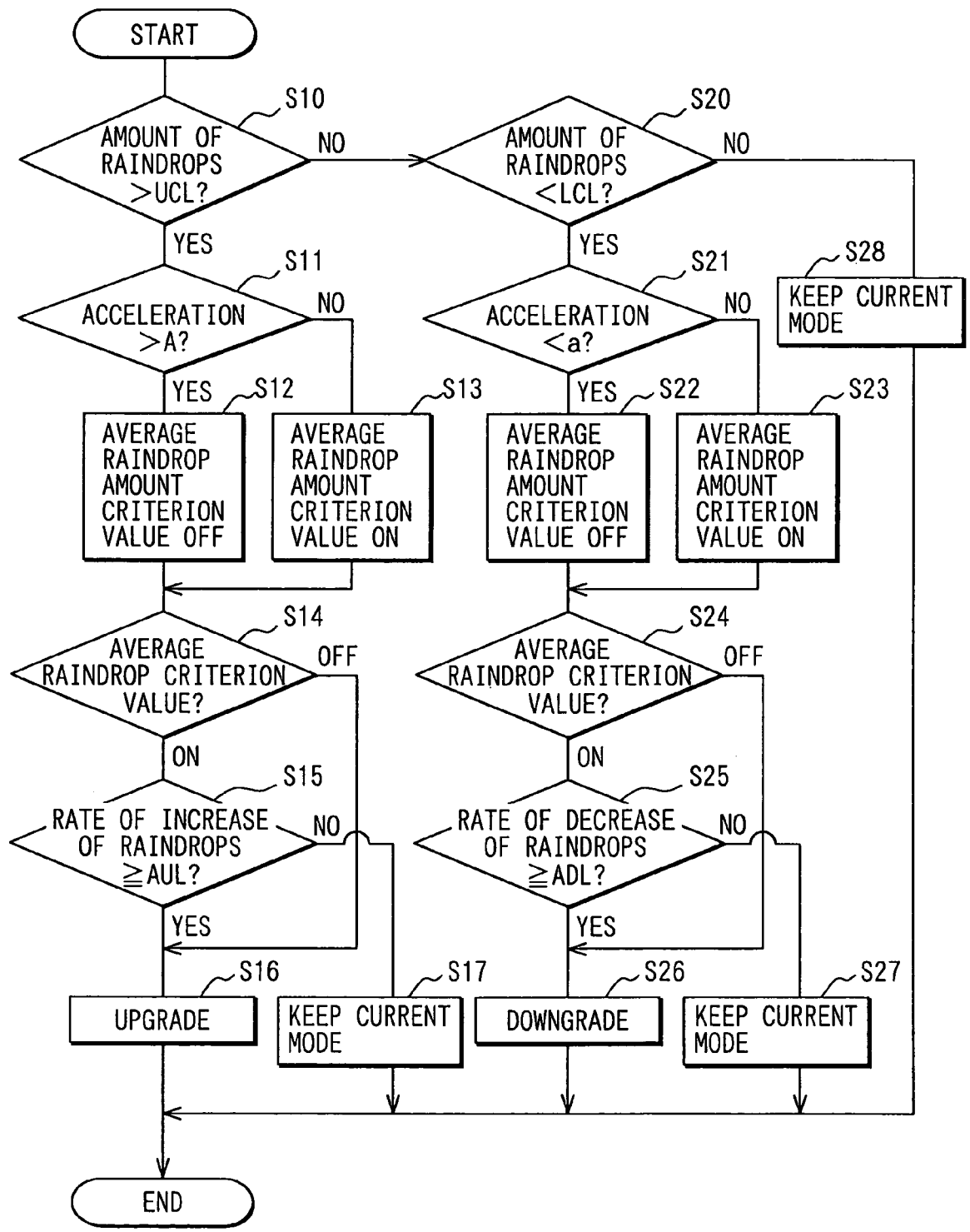
FIG. 3 is a flowchart of a control process for selecting a wipe operation mode according to the operation of FIG. 2.

FIG. 1 is a block diagram showing the configuration of a wiper control system according to this embodiment. FIG. 2 is a flowchart showing an operation of the wiper control system according to this embodiment. FIG. 3 is a flowchart showing a control process for selecting a wipe operation mode of a wiper according to the operation of FIG. 2.

The wiper control system includes, as shown in FIG. 1; wipers 1a and 1b; a wiper motor 2; a motor driving circuit 3; a microcomputer 4 serving as control means; a raindrop sensor 7; a vehicle speed sensor 8; and a wiper switch 9.

The wipers 1a and 1b include wiper blades on the driver seat side and the front passenger seat side, respectively. The wiper blades are provided so as to be able to wipe a surface of a windshield 10. A driving force of the wiper motor 2 is transmitted through a transmission mechanism such as a known link mechanism (not shown) to the wipers 1a and 1b, which are in turn driven by the driving force. Upon reception of an external signal from the wiper switch 9 or the like or a driving signal output from the microcomputer 4, the motor driving circuit 3 supplies electric power to the wiper motor 2 based on the received signal. The wipers 1a and 1b wipe a wipe range of the windshield 10 by an oscillating operation or the like with the driving force of the wiper motor 2 in a fan-like fashion as is defined by a dotted line in FIG. 1. Herein, the wiper motor 2 and the motor driving circuit 3 constitute driving means of forming the wipe operation of the wipers 1a and 1b.

The wiper switch 9 has a switching function of switching between stop of the wipe operation of the wipers 1a and 1b (hereinafter, referred to as an OFF mode), automatic control (hereinafter, referred to as an AUTO mode), a low-speed operation (hereinafter, referred to as an LO mode), and a high-speed operation (hereinafter, referred to as an HI mode) by a manual operation of a driver or the like. The wiper switch 9 is, for example, pivotally operated between four operating positions so as to output a selection signal for selecting a mode from the above-mentioned four modes (hereinafter, referred to as a driver selection signal) to the microcomputer 4 or the motor driving circuit 3. In this embodiment, the driver selection signal is output to the microcomputer 4. If the AUTO mode is selected on the wiper switch 9 by the operation of the driver or the like, the wipe operation of the wipers 1a and 1b is automatically controlled by the microcomputer 4.

The raindrop sensor 7 includes: a light-emitting element 71 such as a light-emitting diode for emitting an infrared ray (hereinafter, referred to as an LED); and a light-receiving element 72 such as a photo-diode capable of receiving the infrared ray (hereinafter, referred to as a PD). The raindrop sensor 7 optically detects a raindrop. Although one pair of the LED 71 and the PD 72 is illustrated in FIG. 1, the number of pairs thereof is not limited; a plurality of pairs of the LED 71 and the PD 72 may be provided. If a plurality of pairs of the LED 71 and the PD 72 are provided within the wipe range of the windshield 10, detection accuracy for the amount of raindrops landed on the windshield 10 (hereinafter, simply referred to as the amount of raindrops) can be improved. For convenience of the description, the number of pairs of the LED 71 and the PD 72 is described as one in the following description of this embodiment.

An LED driving circuit 73 is connected to the LED 71. The LED 71 is controlled to be lighted and lighted out by the microcomputer 4 through the LED driving circuit 73. A wave detector and amplifier circuit 74 is connected to the PD 72. The PD 72 outputs a raindrop detection signal associated with the amount of raindrops to the microcomputer 4 through the wave detector and amplifier circuit 74. The LED 71 and the LED driving circuit 73 constitute light-emitting means, whereas the PD 72 and the wave detector and amplifier circuit 74 constitute light-receiving means. The light-emitting means 71, 73 emits light to an object on which raindrops are to be detected (in this embodiment, the windshield 10). The light-receiving means 72, 74 receives light, which is emitted from the light-emitting means 71, 73 to be then reflected by the windshield 10, so as to output, for example, a raindrop detection signal having an output value approximately proportional to the received light.

The raindrop sensor 7 includes a lens (not shown) for focusing the light emitted from the LED 71 as light to be received by the PD. The raindrop sensor is provided for a detection area 10r on an inner face of the windshield 10. A heater for preventing the formation of condensation on the lens (not shown), a heater circuit, and a temperature sensor for measuring a temperature of the lens are provided for the lens. However, the heater, the heater circuit, and the temperature sensor may be omitted.

The raindrop sensor 7 constitutes raindrop sensing means for detecting the amount of raindrops landed on the windshield 10 (more specifically, the detection area 10r) within the wipe range of the wipers 1a and 1b. The raindrop sensing means outputs a raindrop detection signal associated with the amount of raindrops.

The microcomputer 4 is a microcomputer having a known structure to include the following functions; a CPU 5 for performing a control process and a calculation process; a storage device including a memory such as a read-only memory (ROM) or a writable memory (RAM) for storing various programs and data; an input circuit and an output circuit such as an A/D converter; and a power source circuit and the like. Signals such as a raindrop detection signal output from the raindrop sensor 7, each driver selection signal from the wiper switch 9, and a vehicle speed signal output from the vehicle speed sensor 8 are input to the microcomputer 4.

The CPU 5 performs a control process and a calculation process for selecting the most suitable wipe operation of the wipers in accordance with the average amount of raindrops or the amount of raindrops based on the vehicle speed signal from the vehicle speed sensor 8 and the raindrop detection signal (the amount of raindrops) from the raindrop sensor 7. More specifically, the microcomputer 4 samples the raindrop detection signal from the raindrop sensor 7 at predetermined timing after the wipe operation. The sampling data is stored in the RAM 6 as the amount of raindrops for each wipe cycle.

The RAM 6 stores the data for the amount of raindrops in the order of wipe cycles. The microcomputer 4 performs an averaging calculation (a so-called moving average calculation) by weighting the data of a current (present) amount of raindrops and N−1 previous data corresponding to the number of samples N (for example, 4 in this embodiment) so as to calculate an averaged amount of landed raindrops. However, the weighting and the like may be omitted. The number of samples may be changed depending on various conditions such as the type of vehicle for which the wiper control system is used (the usage of a vehicle and the like) and the detection range of the raindrop sensor 7.

Herein, means for calculating the average amount of raindrops used in this embodiment includes as principle functions: storage means for storing the amount of raindrops in the order of wipe cycles; and setting means for setting the number of samples as a parameter for averaging the amounts of raindrops. A so-called moving average is derived from the latest amount of raindrops detected based on the number of samples and the previous amounts of raindrops excluding the latest amount of raindrops.

By the above process, the latest amount of raindrops detected for each wipe cycle of the wipers is added to the samples. At the same time, the earliest amount of raindrops of all the samples of the amount of raindrops is deleted so as to update the samples for each wipe cycle as needed. The average amount of raindrops is calculated for each wipe cycle by the updated sample. Therefore, substantially simultaneously with the detection of the latest amount of raindrops, the average amount of raindrops can be obtained by averaging the amounts of raindrops including the latest amount of raindrops. Furthermore, by detecting the degree of a change in the average amount of raindrops in the order of wipe cycles, it is possible to know an exact amount of sudden increase or sudden decrease in the latest amount of raindrops.

When an AUTO mode signal among the driver selection signals of the wiper switch 9 is input, the microcomputer 4 determines the wipe operation mode of the wipers 1a and 1b from an output value (the amount of raindrops) of the raindrop detection signal or an output representative value (the average amount of raindrops) obtained by averaging the output values, based on the control program stored in the memory. Then, the microcomputer 4 outputs the selection signal corresponding to the wipe operation mode to the motor driving circuit 3 and controls the driving of the driving means 2, 3 in accordance with the signal.

The vehicle speed sensor 8 outputs a signal indicative of a vehicle speed representing a vehicle running condition (hereinafter, referred to as a vehicle speed signal). The vehicle speed sensor 8 is not limited to those for outputting a vehicle speed signal; any vehicle speed sensor such as an acceleration sensor (hereinafter, referred to as a G sensor) for detecting the acceleration of the vehicle can be used as long as behavior such as a vehicle running condition and the like can be detected. In this case, the acceleration signal output from the G sensor is received by the microcomputer 4, which then performs an arithmetic process such as an integral to calculate a vehicle speed. The vehicle speed signal is to be sent to a control device of an engine, a control device of an automatic transmission, a control device of a vehicle brake (for example, an anti-skid brake) or the like through communication means such as an in-vehicle LAN.

Hereinafter, it is assumed in this embodiment that the vehicle speed signal is transmitted from the vehicle speed sensor 8 to the microcomputer 4. The microcomputer 4 can also calculate the acceleration by an internal calculation upon reception of the vehicle speed signal.

The operation of the wiper control system having the above-described structure according to this embodiment will now be described with reference to FIGS. 2 and 3.

A flowchart shown in FIG. 2 is implemented when the wiper switch 9 is set to the automatic operation mode, for example, during an ON-state of an ignition switch (not shown) of the vehicle.

In a state where the wiper switch 9 is set to the automatic operation mode, the microcomputer 4 initializes data and the like such as a set value of the number of samples for an averaging operation of the amounts of raindrops at S1. At S2, the microcomputer 4 receives the raindrop detection signal corresponding to the amount of raindrops from the raindrop sensor 7 at a predetermined timing after the wipe operation so as to store the raindrop amount data in the RAM 6 in the order of wipe cycles. In the RAM 6, the raindrop amount data for each wipe cycle of the wipers 1a and 1b for at least the number of samples is sequentially stored.

At S3, the microcomputer 4 determines whether the amount of raindrops>0 or not. The microcomputer 4 determines that it is raining if the amount of raindrops is greater than 0 and shifts the process to S4. If the amount of raindrops is not greater than 0, the microcomputer 4 determines that it is not raining and returns the process to S2. The microcomputer 4 repeats the process at S2 and S3 until an amount of raindrops greater than 0 is detected by the raindrop sensor 7.

At S4, the microcomputer 4 calculates an average of the raindrop amount data for the number of samples (four; the current raindrop amount data and three previous raindrop amount data) based on the raindrop amount data received at S2 so as to calculate a moving average. As a result, an average amount of raindrops for the current amount of raindrops and the three previous amounts of raindrops is calculated. Furthermore, since the average amount of raindrops is calculated by a moving average, the average amount of raindrops can be obtained substantially simultaneously with the amount of raindrops being detected by the raindrop sensor 7. Moreover, the microcomputer 4 stores the calculated average amounts of raindrops in the order of wipe cycles into the RAM 6. The RAM 6 holds at least the average raindrop amount data for the previous wipe cycle.

At S5, the microcomputer 4 receives the vehicle speed signal from the vehicle speed sensor 8 so as to store it in the RAM 6. At S6, the microcomputer 4 calculates the amount of a change in vehicle speed (hereinafter, referred to as a vehicle acceleration) from a previously stored vehicle speed. The microcomputer 4 may directly receive the vehicle acceleration from a vehicle acceleration sensor or may receive the vehicle acceleration signal received from the control device of the engine or the like through an in-vehicle LAN and the like as in the case of the vehicle speed signal. In this case, the process at S6 is no more needed, thereby simplifying the control process.

At S7, the microcomputer 4 selects the wipe operation mode, a wiping speed or a wiping interval normally based on the average amount of raindrops, and based on the vehicle acceleration, the amount of raindrops, and the average amount of raindrops when the vehicle behavior is wide or the vehicle acceleration is large. The wiping interval of the wipe operation of the wipers herein means the period of time from the end of wiping the windshield by the wipers to the start of a next wiping. The details of selection of the wipe operation of the wipers will be described below based on FIG. 3. Herein, the control process at S7 constitutes the wipe operation mode selecting means of the wipers. Hereinafter, the control process at S7 is referred to as a control process of selecting the wipe operation mode of the wipers.

At S8, the microcomputer 4 outputs a driving signal indicative of the wipe operation mode selected at S7 to the motor driving circuit 3. Thereafter, the motor driving circuit 3 receiving the driving signal supplies electric power in accordance with the driving signal to the wiper motor 2. The wiper motor 2 transmits a driving force of the motor 2 through a transmission mechanism to the wipers 1a and 1b so as to drive the wipers 1a and 1b at a predetermined wiping speed (at predetermined wiping intervals) in accordance with the selected wipe operation mode.

Next, the details of the control process of selecting the wipe operation mode of the wipers at S7 will be described in accordance with FIG. 3.

At S10, the microcomputer 4 compares an upper criterion limit (hereinafter, referred to as a UCL) and the amount of raindrops captured in the current wipe cycle at S2 (hereinafter, referred to as the amount of currently obtained raindrops). If the amount of currently obtained raindrops exceeds the UCL, it is determined that the amount of raindrops exceeds the upper limit of the amount of raindrops, which may possibly relatively greatly affect the wipe operation. At the same time, it is provisionally determined that the amount of currently obtained raindrops may possibly be due to a sudden increase in the amount of raindrops. Then, the process proceeds to S11. On the other hand, if the amount of currently obtained raindrops is equal to or less than the UCL, the process proceeds to S20. The excess of the amount of raindrops over the UCL due to the process at S10 means that upgrading the wipe operation mode is provisionally selected at this time.

At S20, the microcomputer 4 compares the amount of currently obtained raindrops and a lower criterion limit (hereinafter, referred to as an LCL). If the amount of currently obtained raindrops is less than the LCL, it is determined that the amount of raindrops is less than a lower limit amount of raindrops, which may possibly relatively greatly affect the wipe operation. At the same time, it is provisionally determined that there is a possibility that the amount of currently obtained raindrops is due to a sudden decrease in the amount of raindrops. As a result, the process proceeds to S21.

On the other hand, if the amount of currently obtained raindrops is equal to or larger than the LCL, the amount of currently obtained raindrops is equal to or more than the lower limit of the amount of raindrops and equal to or less than the upper limit of the amount of raindrops. Therefore, it is determined that the amount of currently obtained raindrops is out of the range of the amount of raindrops, which may possibly relatively greatly affect the wipe operation. Therefore, the process proceeds to S28. The amount of raindrops determined to be less than the LCL by the process at S20 means that downgrading of the wipe operation mode is provisionally selected.

The control process at S10 and S20 constitutes raindrop amount provisional determination means for determining whether or not the latest amount of raindrops detected by the raindrop sensor 7 is within a predetermined range of the amount of raindrops, which may possibly relatively greatly affect the wipe operation. The predetermined range of the amount of raindrops is defined by the amount of raindrops >UCL or the amount of raindrops<LCL.

If it is determined in the control process at S10 and S20 that the amount of currently obtained raindrops is out of the predetermined range of the amount of raindrops, the currently implemented wipe operation mode is maintained at S28 so as to terminate the process. As a result, the currently selected wipe operation mode is maintained at the wipe operation mode selected, for example, based on the previously obtained average amount of raindrops (hereinafter, referred to as the previously selected wipe operation mode).

Alternatively, if it is determined at S10 that the amount of currently obtained raindrops is within the predetermined range of the amount of raindrops (specifically, the amount of raindrops>UCL), it is then determined at S11 whether the vehicle acceleration calculated at S6 exceeds an upper acceleration limit criterion value A. Here, A>0 or a positive acceleration, that is, the vehicle is accelerating at a predetermined acceleration A. If it is determined that the vehicle acceleration exceeds the upper acceleration limit criterion value A, it is determined that there is a possibility that the wipe operation is relatively greatly affected so that the process proceeds to S12. On the other hand, if it is determined that the vehicle acceleration is equal to or less than the upper acceleration limit criterion value A, the process proceeds to S13.

Herein, the control process at S11 and S21 described below constitutes acceleration provisional determination means for determining whether or not the vehicle acceleration is within a predetermined range of acceleration, which may possibly relatively greatly affect the wipe operation. The predetermined range of acceleration is defined by the acceleration>A or the acceleration<α described below.

If it is determined at S11 that the vehicle acceleration is within the predetermined range of acceleration (more specifically, the acceleration>A), an average raindrop amount criterion value is set OFF as a determination flag for stopping the wipe operation mode selection based on the average amount of raindrops at S12. Then, the process proceeds to S14.

If it is determined at S11 however that the vehicle acceleration is out of the predetermined range of acceleration, the average raindrop amount criterion value is set ON at S13. Then, the process proceeds to S14.

At S14, the microcomputer 4 determines if the average raindrop amount criterion value is ON or OFF. If the average raindrop amount criterion value is ON, the process proceeds to S15. If the average raindrop amount criterion value is OFF, the process proceeds to S16.

At S15, the microcomputer 4 reads out the average amount of raindrops that was calculated in the previous wipe cycle at S4 (hereinafter, referred to as the previously calculated average amount of raindrops) from the RAM 6 so as to calculate a rate of increase of the average amount of raindrops calculated in the current wipe cycle (hereinafter, referred to as the currently calculated average amount of raindrops) with respect to the previously calculated average amount of raindrops. Furthermore, it is determined whether or not the rate of increase is equal to or more than an increase-side threshold value (hereinafter, referred to as an AUL).

In this embodiment, it is assumed that the AUL is, for example, 5%. If it is determined that the rate of increase is equal to or more than the AUL, it is then determined that the amount of currently obtained raindrops (the amount of raindrops determined at S10 to be within the predetermined range of the amount of raindrops (more specifically, the amount of raindrops>UCL)) greatly contributes to the increase of the average amount of raindrops, the process proceeds to S16. On the other hand, if it is determined that the rate of increase is smaller than the AUL, it is determined that the amount of currently obtained raindrops little contributes to the increase of the average amount of raindrops. Then, the process proceeds to S17.

At S17, after the currently implemented wipe operation mode is maintained so as to select the same wipe operation mode as the currently implemented one, the control process is terminated.

Alternatively, at S16, the wipe operation mode is upgraded. The wipe operation mode obtained by upgrading the currently implemented wipe operation mode is selected to terminate the control process. The process at S16 is implemented even if it is determined that the latest amount of raindrops detected by the raindrop sensor 7, which satisfies the conditions that the amount of raindrops>UCL and the acceleration>A in the above-described control process at S10 and S11 (specifically, the control process at S10, S11 and S14), may possibly relatively greatly affect the wipe operation. In such a control process, the upgrading of the wipe operation provisionally determined at S10 is finally determined at S16 by satisfying the determination conditions of the control process at S1 (more specifically, the control process at S11 and S14).

In the control process at S11 to S13, a process of estimating and determining a sudden increase in the amount of raindrops is performed by comparing the vehicle acceleration with the upper acceleration limit criterion value A. If the vehicle acceleration exceeds the upper acceleration limit criterion value A, it is determined that the amount of raindrops suddenly increases. If the vehicle acceleration is equal to or smaller than the upper acceleration limit criterion value A, it is determined that the amount of raindrops does not suddenly increase.

If the wipe operation mode is upgraded in the control process at S16, the wiping speed is increased or the wiping interval is reduced, for example, the wiping interval is reduced in a single step manner not only in the case where the wipe operation mode is upgraded so that the wipe operation mode having a wiping speed higher than that in the currently implemented wipe operation mode is selected from the wipe operation modes within the preset range of the wiping speed. In this case, the reduced wiping interval is obtained based on a difference between the amount of raindrops and the UCL, a difference between the vehicle acceleration and the upper acceleration limit criterion value A and the like. In an alternative embodiment, the reduced wiping interval may also be obtained by using a map.

In this embodiment, the average amount of raindrops is obtained by a moving average calculated by an averaging technique through a so-called moving average. In the process at S15, a change in the average amount of raindrops between an earlier wipe cycle and a later wipe cycle is compared with the AUL. As a result, based on a change in the average amount of raindrops between the earlier wipe cycle and the later wipe cycle, that is, a change (a difference or a rate of change) between the previously calculated average amount of raindrops and the currently calculated average amount of raindrops, an exact amount of a sudden increase or of a sudden decrease in the latest amount of landed raindrops can be known.

Next, if it is determined at S20 that the amount of currently obtained raindrops is within a predetermined range of the amount of raindrops (specifically, the amount of raindrops<LCL), it is determined at S21 whether the vehicle acceleration calculated at S6 is less than the lower acceleration limit criterion value $\alpha$. Here, $\alpha<0$ or a negative acceleration, that is, the vehicle is decelerating at a predetermined acceleration $\alpha$. If it is determined that the vehicle acceleration is less than the lower acceleration limit criterion value $\alpha$, it is determined that the vehicle acceleration may possibly relatively greatly affect the wipe operation so that the process proceeds to S22. On the other hand, if it is determined that the vehicle acceleration is equal to or more than the lower acceleration limit criterion value $\alpha$, it is determined that the vehicle acceleration is equal to or lower than the upper acceleration limit so that the process proceeds to S23.

If it is determined at S21 that the vehicle acceleration is within the predetermined range of the acceleration (more specifically, the acceleration<$\alpha$), the average raindrop amount criterion value is set OFF as a determination flag for stopping the wipe operation mode selection based on the average amount of raindrops at S22 so that the process proceeds to S24.

If it is determined at S21 that the vehicle acceleration is out of the predetermined range of acceleration, the average raindrop amount determination criterion value is set ON at S23 so that the process proceeds to S24.

At S24, the microcomputer 4 determines if that the average raindrop amount criterion value is ON or OFF. If the average raindrop amount criterion value is ON, the process proceeds to S25. On the other hand, if the average raindrop amount criterion value is OFF, the process proceeds to S26.

At S25, the microcomputer 4 reads out the previously calculated average amount of raindrops from the RAM 6 so as to calculate a rate of decrease of the currently calculated average amount of raindrops with respect to the previously calculated average amount of raindrops. Furthermore, it is determined whether or not the rate of decrease is equal to or larger than a decrease-side threshold value (hereinafter, referred to as an ADL). In this embodiment, it is assumed that the ADL is, for example, 5%. If it is determined that the rate of decrease is equal to or larger than the ADL, it is determined that the amount of currently obtained raindrops greatly contributes to the increase of the average amount of raindrops so that the process then proceeds to S26. On the other hand, if it is determined that the rate of decrease is less than the ADL, it is determined that the amount of currently obtained raindrops contributes little to the increase of the average amount of raindrops so that the process proceeds to S27.

At S27, after the currently implemented wipe operation mode is maintained so as to select the same wipe operation mode as the currently implemented one, the control process is terminated.

At S26, after the wipe operation mode is downgraded so as to select a wipe operation mode that is downgraded with respect to the currently implemented wipe operation mode, the control process is terminated. The step S26 is implemented even in the case where it is determined in the control process at S20 and S21 described above (more specifically, in the control process at S20, S21 and S24) that the latest amount of raindrops detected by the raindrop sensor 7 satisfies the conditions that the amount of raindrops<LCL and the acceleration<$\alpha$ so as to possibly relatively greatly affect the wipe operation. In such a control process, as a result of satisfying the determination conditions in the control process at S21 (specifically, the control process at S21 and S24), the downgrading of the wipe operation that is provisionally determined at S20 is finally determined at S26.

Herein, in the control process from S21 to S23, by the comparison of the vehicle acceleration with the lower acceleration limit criterion value a, the process of estimating and determining a sudden decrease in the amount of raindrops is implemented. If the vehicle acceleration is less than the lower acceleration limit criterion value $\alpha$, it is determined that the amount of raindrops suddenly decreases. If the vehicle acceleration is equal to or larger than the lower acceleration limit criterion value $\alpha$, it is determined that the amount of raindrops does not suddenly decrease.

If the wipe operation mode is downgraded in the control process at S26, the wiping speed is decreased or the wiping interval is prolonged not only in the case where the wipe operation mode with a lower wiping speed than that of the currently implemented wipe operation mode is selected from the wipe operation modes within a preset range of wiping speed. For example, the wiping interval may be prolonged in a single-step manner. In this case, the prolonged wiping interval is obtained by an operation with a difference between the amount of raindrops and the LCL, a difference between the vehicle acceleration and the lower acceleration limit criterion value α and the like. Alternatively, in another embodiment, the prolonged wiping interval may be obtained by using a map.

Next, the functions and effects of this embodiment are described as follows.

In this embodiment, for example, the wipe operation mode of the wipers is not selected based on the average amount of landed raindrops as in the conventional technique, but rather the vehicle acceleration serving as a representative value indicative of a change in vehicle behavior is also taken into consideration. Therefore, it is possible to determine whether or not there is a relatively sudden increase or decrease in the amount of landed raindrops due to a change in vehicle behavior or the like.

In the case where the vehicle is accelerating, it is possible to determine whether or not there is a sudden increase in the amount of raindrops due to a change in vehicle behavior or the like by monitoring the accelerating state of the vehicle at S11. Furthermore, if the vehicle acceleration exceeds the upper acceleration limit criterion value, it is determined that the amount of raindrops suddenly increases. By selecting the wipe operation mode (upgrading) that is provisionally determined based on the amount of raindrops detected for each wipe cycle at S10, the ability to adjust the wipe operation of the wipers in response to the amount of raindrops can be improved. For example, when the vehicle starts after a stop state, it is necessary to particularly watch out for a pedestrian and a vehicle in the vicinity. In such a case, the start of the vehicle is determined from the acceleration. As a result, the adjustment of the wipe operation of the wipers is improved so as to surely ensure visibility to improve safety.

In the case where the vehicle is decelerating, the decelerating state of the vehicle is monitored at S21 so as to determine whether or not there is a sudden decrease in the amount of raindrops due to a change of vehicle behavior or the like. If the vehicle acceleration is less than the lower acceleration limit criterion value, it is determined that the amount of raindrops suddenly decreases. By selecting the wipe operation mode (downgrading) that is provisionally determined based on the amount of raindrops detected for each wipe cycle at S20, the ability of adjusting the wipe operation of the wipers in response to a change in the amount of raindrops can be improved. As a result, the troublesomeness of a fast wipe operation being performed although the amount of landed raindrops suddenly decreases due to the deceleration of the vehicle can be removed.

Furthermore, it is determined whether or not the wipe operation mode selection is implemented based on the average amount of raindrops based on the acceleration of the vehicle (the control process at S11 to S13 and S21 to S23) before the wipe operation mode selection based on the average amount of raindrops (the control process at S15 and S25). If the implementation of selection of the wipe operation mode based on the average amount of raindrops is not preferred, it is determined that there is a sudden increase or decrease in the amount of raindrops due to a change of vehicle behavior or the like so as to implement the wipe operation mode selection based on the amount of raindrops or the vehicle acceleration. Therefore, a control process for selecting the wipe operation mode based on the average amount of raindrops can be omitted, thereby reducing processing time.

Further yet, the amount of raindrops detected for each wipe cycle at S10 and S20 and the UCL or the LCL are compared with each other so as to determine whether or not the amount of raindrops suddenly increases or decreases to select a provisional wipe operation mode. Furthermore, it is determined in the control process at S11 and S21 whether or not an increase or a decrease in the amount of raindrops is due to a change in vehicle behavior or the like based on the vehicle acceleration. If the vehicle acceleration is out of the range defined by the upper and lower acceleration limit criterion values, the provisional wipe operation mode is determined as a final wipe operation mode. As a result, as compared with the case where the wipe operation mode is selected based only on the vehicle acceleration, the wipe operation mode is appropriately selected in accordance with an actual amount of raindrops.

Further still, in the control process at S15 and S25, the wipe operation mode is selected based on a rate of change between the previously calculated average amount of raindrops and the currently calculated average amount of raindrops. Since the wipe operation mode is selected based on the rate of change, it is possible to detect even a subtle change. Therefore, as compared with the case where the wipe operation mode is selected based on an absolute value of the average amount of raindrops, an appropriate wipe operation mode can be selected.

Further still, since the moving average is used as the average amount of raindrops, the amount of sudden increase or decrease in the latest amount of raindrops can be surely obtained without being affected by data of the past amount of raindrops.

The above-described processing procedure may be changed or eliminated as long as it does not depart from the scope of the present invention. For example, it is conceivable to determine whether or not the vehicle acceleration is within a predetermined range before the process of comparing the amount of raindrops and the UCL or the LCL with each other. Moreover, the wipe operation mode or the reduction or prolongation of the wiping interval can be determined based only on the vehicle acceleration being out of the predetermined range, without comparing the amount of raindrops and the UCL or the LCL with each other. The mode in which the wiping interval is determined based only on the vehicle acceleration will be described in detail in a fourth embodiment.

Hereinafter, the other embodiments, to which the present invention is applied, will be described. In the following embodiments, the same components or components equivalent to those of the first embodiment are denoted by the same reference numerals, and the repetition of description is avoided.

In the control process at S15 and S25 for selecting the wipe operation mode based on the average amount of raindrops described in the first embodiment, the degree of change in the average amount of raindrops between the earlier wipe cycle and the later wipe cycle is detected so as to be compared with the AUL or the ADL serving as a threshold value. The threshold values AUL and ADL are set as fixed values (5%).

Figure 4:
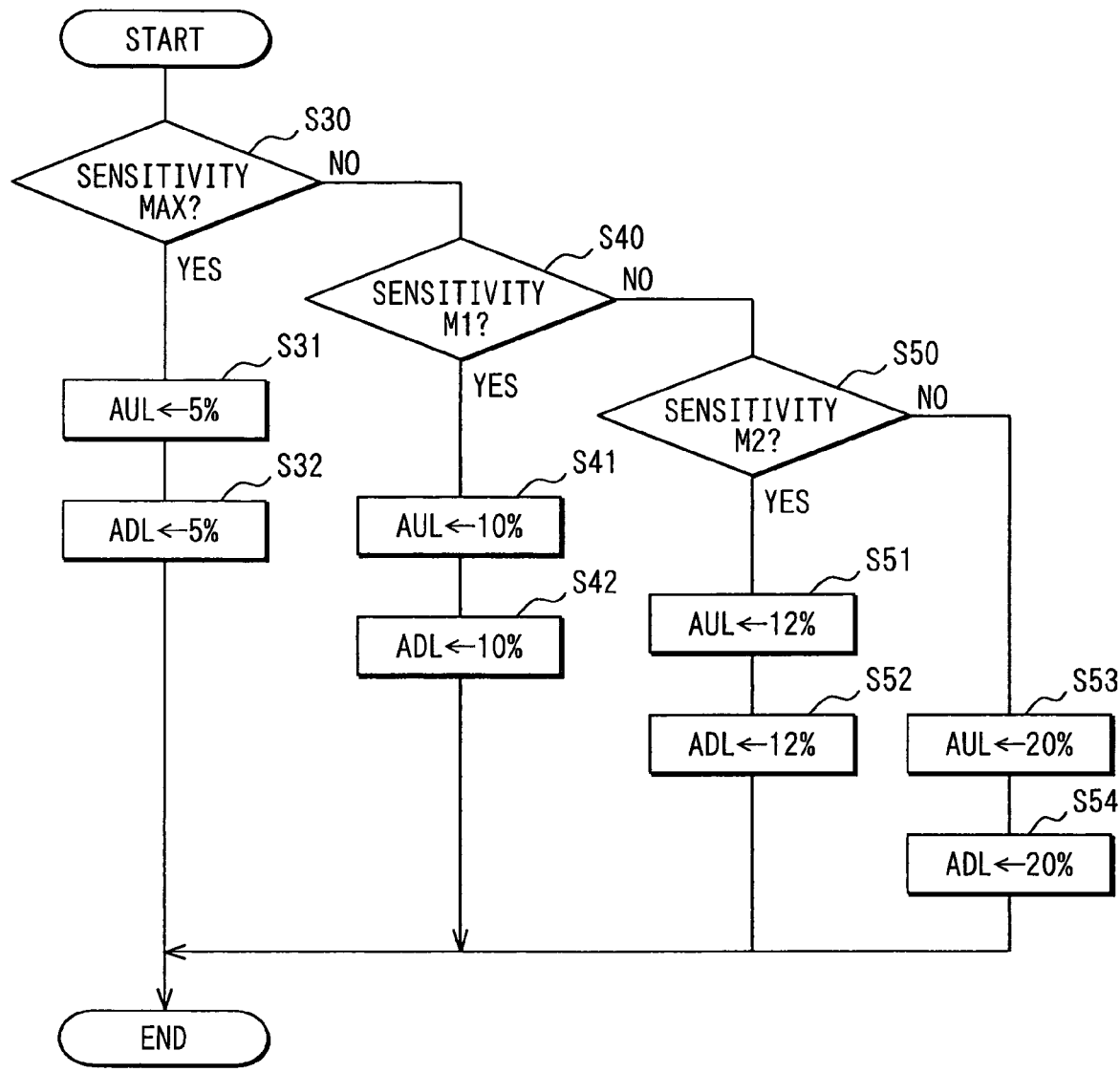
FIG. 4 is a flowchart of a part of a control process for selecting a wipe operation mode based on an average amount of raindrops according to a second embodiment.

In the second embodiment, as shown in FIG. 4, the threshold values AUL and ADL are varied. FIG. 4 shows a part of a control process of selecting the wipe operation mode based on the average amount of raindrops according to this second embodiment. FIG. 4 is a flowchart showing a control process of varying a change rate criterion value for selecting the wipe operation mode by the comparison of a rate of change between the current average amount of raindrops and the previous average amount of raindrops in accordance with a sensitivity (hereinafter, an operation sensitivity).

The wiper switch 9 has a switching function for switching at four levels, that is, between an operation sensitivity MAX, an operation sensitivity M1, an operation sensitivity M2, and an operation sensitivity MIN by a manual operation of the driver or the like. The operation sensitivities MAX, M1, M2, and MIN are switching information for setting an operation sensitivity of responsibility of the wipe operation of the wipers (more specifically, the ability to adjust the wipe operation in accordance with the amount of raindrops) to be within the range of a predetermined level. The wiper switch 9 transmits a switching signal indicative of the switching information to the microcomputer 4. The operation sensitivity is increased in the order of the operation sensitivity MIN, the operation sensitivity M2, the operation sensitivity M1, and the operation sensitivity MAX, and is switchable in accordance with the preference of the driver.

Upon reception of the switching signal from the wiper switch 9, the microcomputer 4 sets the threshold values AUL and ADL in accordance with the switching signal. In this embodiment, the AUL and the ADL are set to 20%, 12%, 10%, and 5% in accordance with the operation sensitivity MIN, the operation sensitivity M2, the operation sensitivity M1, and the operation sensitivity MAX, respectively.

The operation of the wiper control system having the above-described structure in this embodiment, in particular, a switching procedure of the above-described operation sensitivities will be described in accordance with FIG. 4. As shown in FIG. 4, in the control process at S30, S40, and S50, the microcomputer 4 receives the switching signal from the wiper switch 9 so as to determine which operation sensitivity is indicated by the switching signal. At S30, the microcomputer 4 determines whether or not the switching signal is indicative of the operation sensitivity MAX. If the switching signal is indicative of the operation sensitivity MAX, the microcomputer 4 sets the AUL to 5% at S31 and then sets the ADL to 5% at S32 to terminate the process.

At S40, the microcomputer 4 determines whether or not the switching signal is indicative of the operation sensitivity M1. If the switching signal is indicative of the operation sensitivity M1, the microcomputer 4 sets the AUL to 10% at S41 and then sets the ADL to 10% at S42 to terminate the process.

At S50, the microcomputer 4 determines that the switching signal is indicative of the operation sensitivity M2 or the sensitivity MIN. If the switching signal is indicative of the operation sensitivity M2, the microcomputer 4 sets the AUL to 12% at S51 and then sets the ADL to 12% at S52 to terminate the process.

In the case where the switching signal is indicative of the operation sensitivity MIN, if it is determined NO in the control process at S50 (more specifically, at S30, S40 and S50), the microcomputer 4 sets the AUL to 20% at S53 and then sets the ADL to 20% at S54 to terminate the process.

The set threshold values AUL and ADL are reflected on the control process at S15 and S25. If the switching signal is determined to have the operation sensitivity MAX, the set threshold values AUL and ADL are the smallest. Therefore, even if a change in the average amount of raindrops is relatively subtle, the wipe operation mode of the wipers is upgraded or the wiping interval is reduced to increase the frequency of the wiper operations. On the other hand, if the switching signal is determined to have the operation sensitivity MIN, the set threshold values AUL and ADL are the largest. Therefore, the frequency of wiper operations is reduced as compared with the case of the sensitivity MAX and the like.

Next, the functions and effects of this embodiment will be described.

The microcomputer 4 receives the switching signal for switching the operation sensitivity from the wiper switch 9. Based on the switching signal, the threshold values AUL and ADL are varied. Therefore, the most suitable wiper control in accordance with the preference of the driver can be achieved.

Moreover, the threshold values AUL and ADL may be changed in accordance with running speed of the vehicle. The reason for this is as follows. In comparison of the case with high vehicle speed and the case with low vehicle speed, the phenomenon that the driver's field of vision becomes narrower as the vehicle speed becomes higher occurs. For the safety of vehicle running, the ability to adjust the mode is response to the amount of raindrops is required to be increased to ensure visibility as the vehicle speed becomes higher as compared with the case where the vehicle speed is low.

Figure 5:
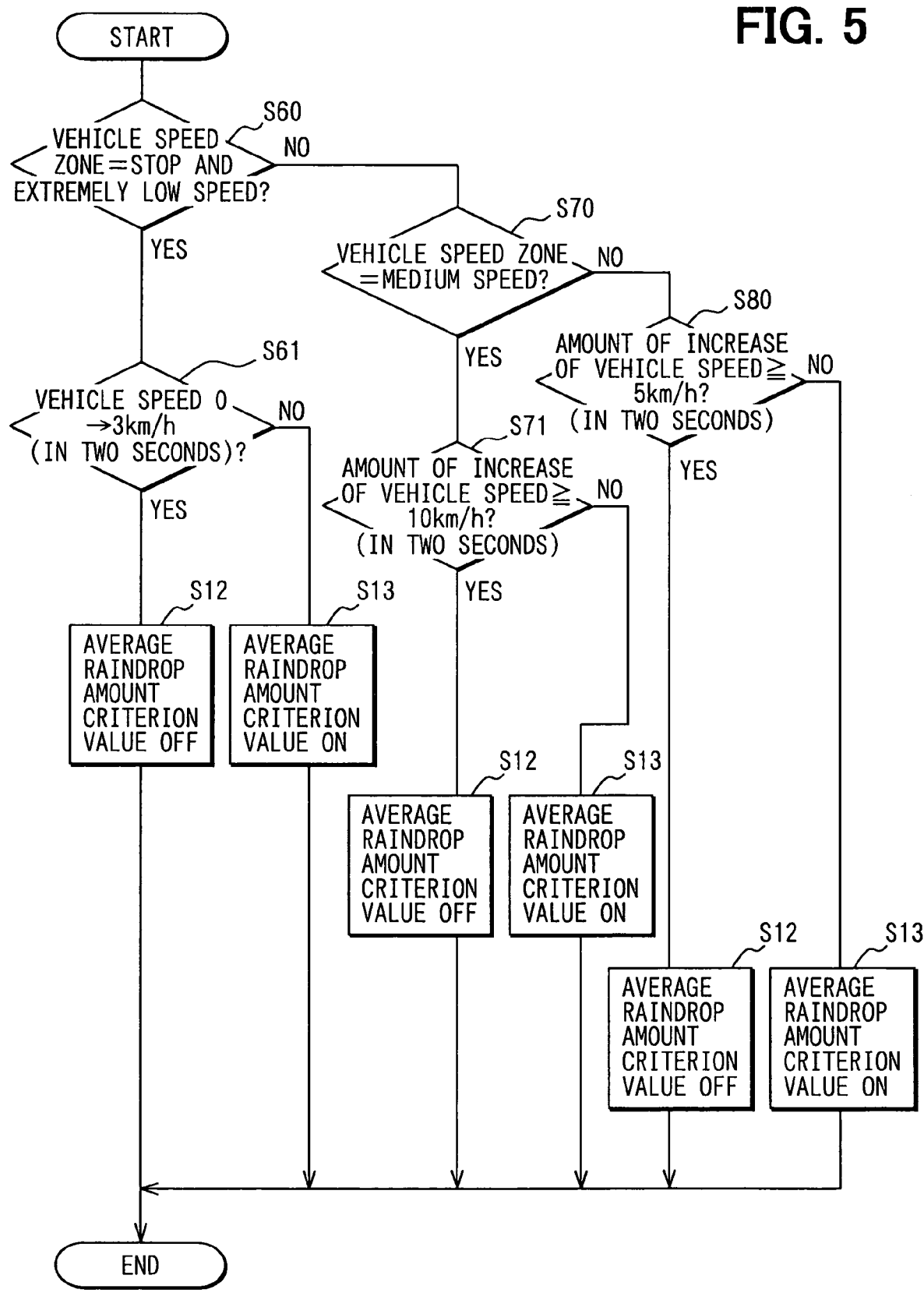
FIG. 5 is a flowchart of a part of a control process for determining whether the selection of a wipe operation mode is implemented or not in accordance with the degree of acceleration based on an average amount of raindrops according to a third embodiment.
Figure 6:
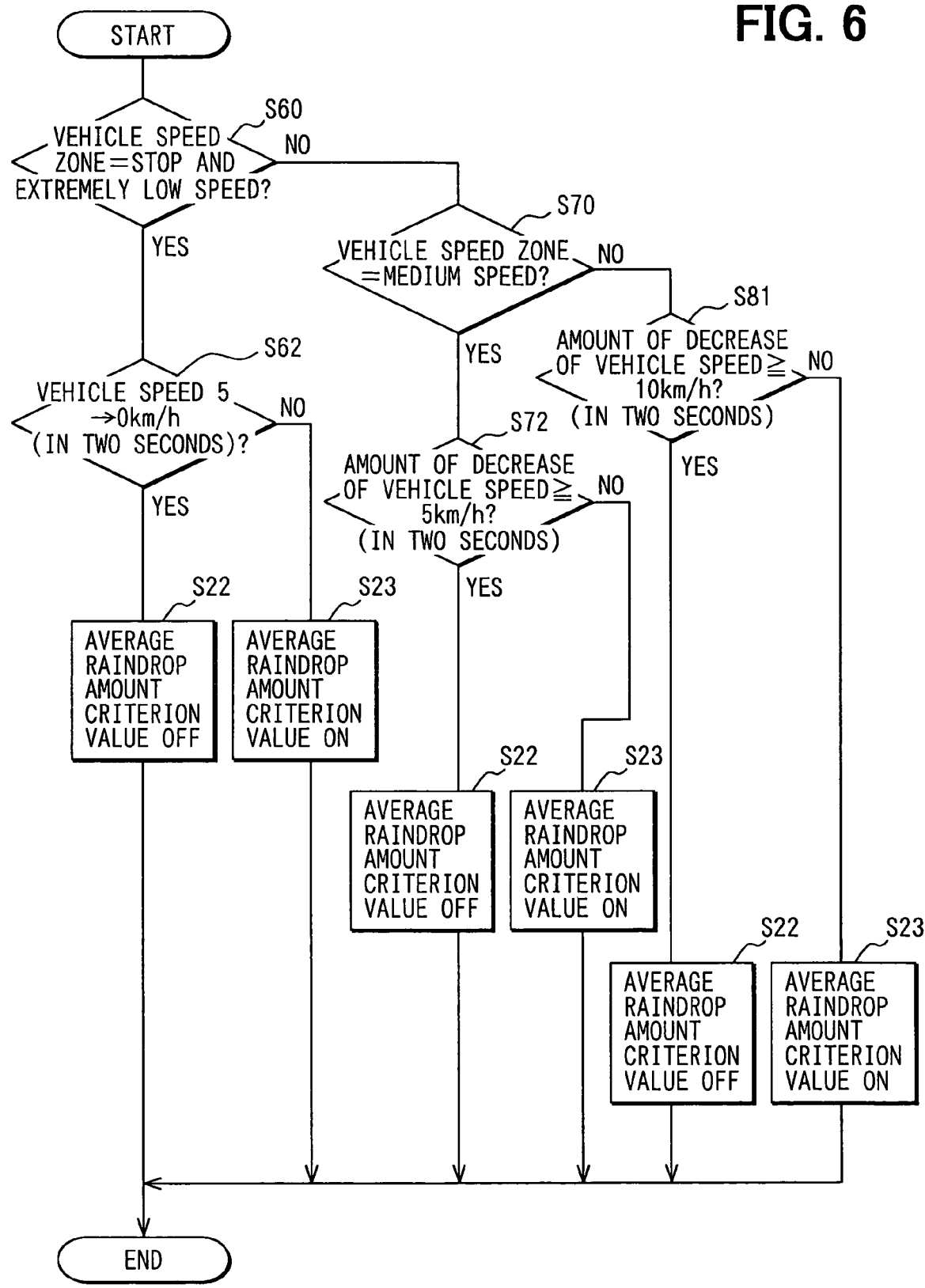
FIG. 6 is a flowchart of a part of the control process for determining whether the selection of a wipe operation mode is implemented or not in accordance with the degree of acceleration based on an average amount of raindrops according to the third embodiment.
Figure 7:
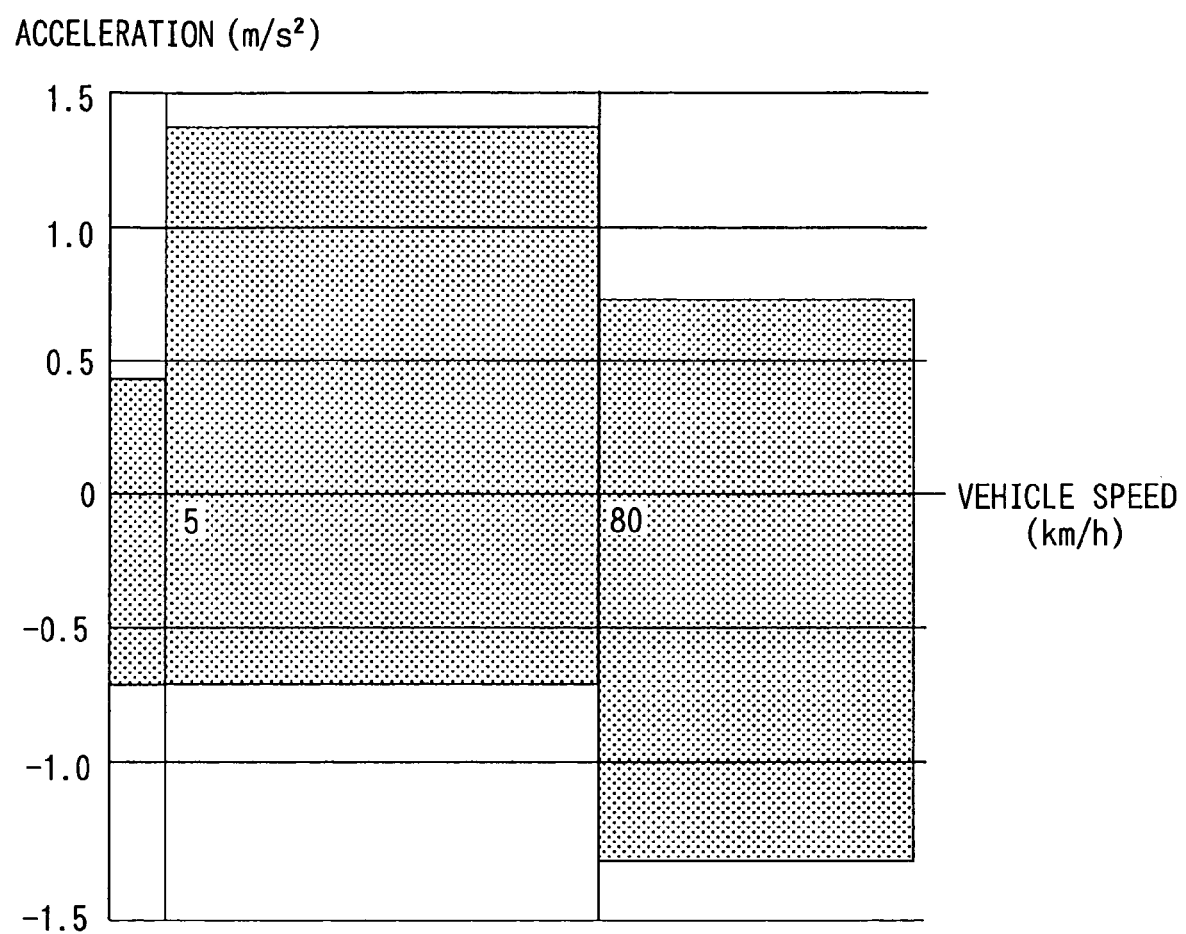
FIG. 7 is a graph illustrating a relationship between a range of acceleration and a range of vehicle speed in the processes of FIGS. 5 and 6.

FIGS. 5 and 6 show a third embodiment, wherein the acceleration criterion value is varied in accordance with the vehicle speed. FIG. 5 shows a part of a control process of determining in accordance with the acceleration whether or not the selection of the wipe operation mode is implemented based on the average amount of raindrops according to this embodiment. FIG. 5 is a flowchart showing a control process of changing the upper acceleration limit criterion value in accordance with a vehicle speed zone in the case of acceleration of the vehicle. FIG. 6 shows a part of a control process of determining in accordance with the acceleration whether or not the selection of the wipe operation mode is implemented based on the average amount of raindrops. FIG. 6 is a flowchart showing a control process of changing the lower acceleration limit criterion value in accordance with a vehicle speed zone in the case of deceleration of the vehicle. FIG. 7 is a graph showing the relation between the range of acceleration and the range of vehicle speed in FIGS. 5 and 6.

In this embodiment, the microcomputer 4 includes vehicle speed zone setting means; upper acceleration limit criterion value setting means; and lower acceleration limit criterion value setting means. The vehicle speed zone setting means divides the range of vehicle speed, at which the vehicle can run, into a plurality of zones. In this embodiment, for example, the vehicle speed zone is divided into three zones, that is, a stop and extremely low speed zone (0 km/h to less than 5 km/h), a medium speed zone (5 km/h to less than 80 km/h), and a high speed zone (80 km/h and higher). The upper and lower acceleration criterion value setting means are means for setting the upper acceleration limit criterion value and the lower acceleration limit criterion value for each of the vehicle speed zones, respectively.

A procedure of variably processing the upper acceleration limit criterion value in accordance with the vehicle speed will be described in accordance with FIG. 5. As shown in FIG. 5, in a control process at S60 and S70, the microcomputer 4 determines to which vehicle speed zone the vehicle speed corresponds. At S60, the microcomputer 4 determines whether or not the vehicle speed is in the stop and extremely low speed zone. If the vehicle speed falls in the stop and extremely low speed zone, the microcomputer 4 shifts the process to S61. If the vehicle speed does not fall in the stop and extremely low speed zone, the process proceeds to S70.

At S61, the microcomputer 4 determines whether or not the vehicle speed is changed from 0 km/h to 3 km/h in two seconds. If it is determined YES, the microcomputer 4 shifts the process to S12 to set the average raindrop amount criterion value OFF so as to terminate the process. If it is determined NO, the microcomputer 4 shifts the process to S13 to set the average raindrop amount criterion value ON so as to terminate the process.

At S70, the microcomputer 4 determines whether or not the vehicle speed is in the medium speed zone. If the vehicle speed is in the medium speed zone, the microcomputer 4 shifts the process to S71. If the vehicle speed is not in the medium speed zone, it is determined that the vehicle speed is in the high speed zone to shift the process to S80.

At S71, the microcomputer 4 determines whether or not the vehicle speed is increased by 10 km/h or more in two seconds. If it is determined YES, the microcomputer 4 shifts the process to S12 so as to then terminate the process. If it is determined NO, the microcomputer 4 shifts the process to S13 so as to then terminate the process.

At S80, the microcomputer 4 determines whether or not the vehicle speed is increased by 5 km/h or more in two seconds. If it is determined YES, the microcomputer 4 shifts the process to S12 so as to then terminate the process. If it is determined NO, the microcomputer 4 shifts the process to S13 to then terminate the process.

Next, a procedure of variably processing the lower acceleration limit criterion value in accordance with the vehicle speed will be described in accordance with FIG. 6. Since the control processes at S60 and S70 are the same as those in FIG. 5, the description thereof is herein omitted. As shown in FIG. 6, if the vehicle speed is in the stop and extremely low vehicle speed zone at S60, the microcomputer 4 shifts the process to S62. If the vehicle speed is not in the stop and extremely low vehicle speed zone, the process proceeds to S70.

At S62, the microcomputer 4 determines whether or not the vehicle speed is changed from 5 km/h to 0 km/h in two seconds. If it is determined YES, the microcomputer 4 shifts the process to S22 to set the average raindrop amount criterion value OFF so as to terminate the process. If it is determined NO, the microcomputer 4 shifts the process to S23 to set the average raindrop amount criterion value ON so as to terminate the process.

If the vehicle speed is in the medium speed zone at S70, the microcomputer 4 shifts the process to S72. If the vehicle speed is not in the medium speed zone, the process proceeds to S81.

At S72, the microcomputer 4 determines whether or not the vehicle speed is reduced by 5 km/h or more in two seconds. If it is determined YES, the microcomputer 4 shifts the process to S22 so as to then terminate the process. If it is determined NO, the microcomputer 4 shifts the process to S23 to then terminate the process.

At S81, the microcomputer 4 determines whether or not the vehicle speed is reduced by 10 km/h or more in two seconds. If it is determined YES, the microcomputer 4 shifts the process to S22 so as to then terminate the process. If it is determined NO, the microcomputer 4 shifts the process to S23 to then terminate the process.

Next, the effects of the control process of variably setting the upper acceleration limit criterion value and the lower acceleration limit criterion value in accordance with the vehicle speed will be described in accordance with FIG. 7. In FIG. 7, the axis of abscissa indicates a vehicle speed (km/h) whereas the axis of ordinate indicates an acceleration ($m/s^2$). In the case where the vehicle speed is in the stop or extremely low speed zone, the range of acceleration is set to about −0.69 to +0.42 $m/s^2$ (see S61 and S62). In the case where the vehicle is in the medium speed zone, the range of acceleration is set to about −0.69 to +1.39 $m/s^2$ (see S71 and S72). In the case where the vehicle is in the high speed zone, the range of acceleration is set to about −1.39 to +0.69 $m/s^2$ (see S80 and S81).

The upper limit value and the lower limit value of the range of acceleration in the case where the vehicle speed is in the stop or extremely low speed zone are set to be lower than those of the other vehicle speed zones. The reason for such setting is as follows: when the vehicle starts, the driver is required to be fully aware of the surroundings (a pedestrian and the other vehicles). Therefore, the upper limit value of the range of acceleration is set to be lower than those of any other vehicle speed zones so that the wipers can be controlled in accordance with the amount of raindrops at any given time even at extremely small acceleration of the vehicle.

On the other hand, when the vehicle is stopped, the driver is required to have good visibility to a certain degree. Therefore, the lower limit value of the range of acceleration in the vehicle speed zone is set so that the wiping interval of the wipe operation of the wipers is not prolonged at a normal deceleration.

The upper limit value of the range of acceleration in the case where the vehicle speed is in the medium speed zone is set to be higher than those of the other vehicle speed zones, whereas the lower limit value is set to the same value as that in the case of the vehicle speed zone described above. The reason for such setting is as follows: the vehicle often runs through a city and the most often runs at a speed in this vehicle speed zone. Since the number of intersections and signals is large and traffic is heavy in a city, the vehicle running there has an increasing frequency of repeating acceleration and deceleration.

If the upper limit value is set low, the vehicle acceleration more frequently falls within and gets out of the range of acceleration because the vehicle repeats acceleration and deceleration. Therefore, the wiper control based on the amount of raindrops or based on the average amount of raindrops is frequently performed. As a result, the wipe operation of the wipers is not stabilized to make the driver feel uncomfortable. Therefore, the upper limit value of the range of acceleration in this vehicle speed zone is set higher than those of the other vehicle speed zones. The lower limit value is set in the same manner as the above-described vehicle speed zone.

The upper limit value of the range of acceleration in the case where the vehicle speed is in the high speed zone is set lower than those of the medium speed zone, whereas the lower limit value is set lower than those of the other vehicle speed zones. The reason for such setting is as follows: when the vehicle runs at a high speed, for example, on an expressway, the driver's field of vision tends to be narrow as compared with the case where the vehicle runs at a low speed. When it is raining or a road surface is wet, the windshield may possibly get wet with a water splash created by a vehicle in the vicinity or in the opposite lane.

If, for example, the vehicle accelerates so as to overtake a vehicle in front in such a circumstance, the vehicle overtakes the vehicle in front while getting wet with a splash of water created by the vehicle in front. In order to safely overtake the vehicle in front, it is necessary to surely ensure the visibility. Therefore, for example, the upper limit value of the range of acceleration in the vehicle speed zone is set to be a little lower than the average acceleration in the case of overtake at a high running speed. In order to improve the ability to adjust the wipe operation of the wipers at the time of overtake, the wipe operation mode is selected based on the amount of raindrops so as to ensure visibility.

On the other hand, in the case where the vehicle decelerates, the vehicle in the vicinity still creates a high splash of water. Therefore, even if the vehicle decelerates, it is necessary to ensure the visibility. The lower limit value is set lower than those of the other vehicle speed zones so that the wipe operation mode is not selected based on the amount of raindrops in normal deceleration, thereby preventing the wipe operation mode of the wipers from being downgraded.

In this embodiment, the vehicle speed zone is divided into three zones so that the range of acceleration is set for each of the zones. However, the number of vehicle speed zones is not limited to three; the vehicle speed zone may be divided into two, four zones or the like, or may also be divided in a single-step manner. If the vehicle speed zone is set in a single-step manner, the range of acceleration is obtained by, for example, a relational expression expressed by the vehicle speed and the acceleration.

Figure 8:
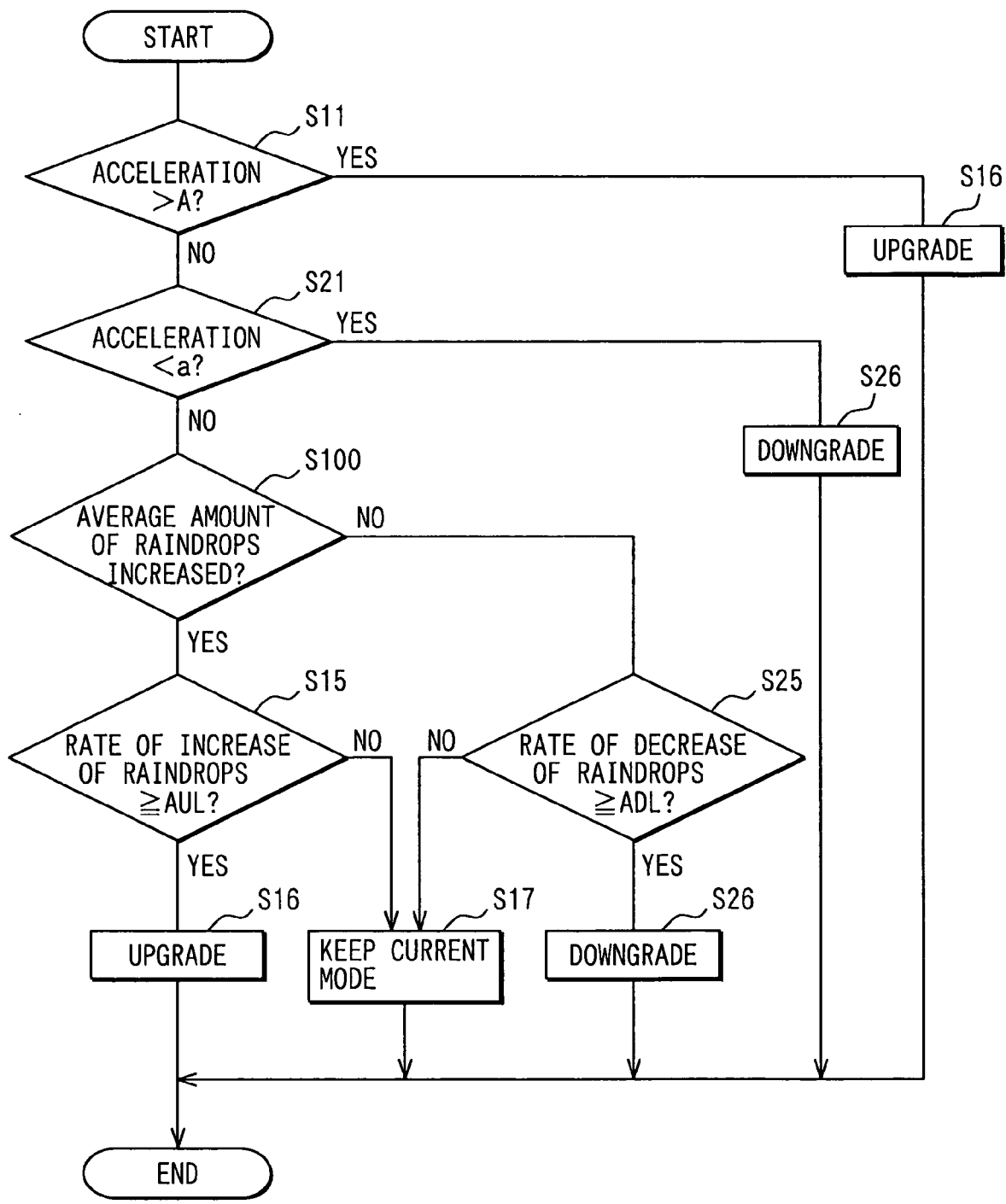
FIG. 8 is a flowchart of a control process for selecting a wipe operation mode of wipers according to a fourth embodiment.

A fourth embodiment is shown in FIG. 8. The process of comparing the amount of raindrops with the UCL or the LCL for selecting the wipe operation mode of the wipers, which has been implemented in the first embodiment, is omitted. FIG. 8 is a flowchart showing a control process of selecting a wipe operation mode of the wipers according to this fourth embodiment.

As shown in FIG. 8, in the control processes at S11 and S21, the degree of acceleration of the vehicle is determined. At S11, if it is determined that the vehicle acceleration exceeds the upper acceleration limit criterion value A, the microcomputer 4 shifts the process to S16 to upgrade the wipe operation mode so as to terminate the process. If it is determined that the vehicle acceleration is equal to or less than the upper acceleration limit criterion value A, the microcomputer 4 shifts the process to S21.

At S21, if it is determined that the vehicle acceleration is less than the lower acceleration limit criterion value a, the microcomputer 4 shifts the process to S26 to downgrade the wipe operation mode so as to terminate the process. If it is determined that the vehicle acceleration is equal to or greater than the lower acceleration limit criterion value a, the microcomputer 4 shifts the process to S100.

At S100, the microcomputer 4 compares the average amount of raindrops calculated in the previous wipe cycle and the average amount of raindrops calculated in the current wipe cycle with each other so as to determine whether or not the average amount of raindrops has increased. If the average amount of raindrops has increased, the microcomputer 4 shifts the process to S15. If the average amount of raindrops decreases as compared with the previous one or is substantially the same, the microcomputer 4 shifts the process to S25.

At S15, if a rate of increase of the average amount of raindrops is equal to or greater than the AUL, the microcomputer 4 shifts the process to S16 to upgrade the wipe operation mode so as to then terminate the process. If the rate of increase of the average amount of raindrops is less than the AUL, the microcomputer 4 shifts the process to S17 to keep the current wipe operation mode so as to then terminate the process.

At S25, if the rate of decrease of the average amount of raindrops is equal to or greater than the ADL, the microcomputer 4 shifts the process to S26 to downgrade the wipe operation mode so as to then terminate the process. If the rate of decrease of the average amount of raindrops is less than the ADL, the microcomputer 4 shifts the process to S17 to keep the current wipe operation mode so as to then terminate the process.

Next, the functions and effects of this embodiment will be described.

The process of comparing the amount of raindrops with the UCL or the LCL for selecting the wipe operation mode of the wipers (the control processes at S10 and S20), which has been implemented in the first embodiment, is omitted so as to select the wipe operation mode. Therefore, the process can be simplified, that is, processing time until the selection of the wipe operation mode can be reduced.

What is claimed is:

1. A wiper control system for detecting an amount of raindrops landed on a windshield of a vehicle and driving a wipe operation of a wiper to wipe the landed raindrops, the wiper control system comprising:

raindrop sensing means capable of detecting the amount of landed raindrops for each of a plurality of wipe cycles of the wiper;

average landed raindrop amount calculation means for calculating an average value of the amount of landed raindrops for the plurality of wipe cycles;

vehicle acceleration sensing means for determining an acceleration of the vehicle;

wipe operation mode selection means for selecting a wipe operation mode, wherein the wipe operation mode selection means selects the wipe operation mode of the wiper based on the acceleration of the vehicle and one of the amount of landed raindrops and the average amount of landed raindrops;

determination means for determining based on the vehicle acceleration whether or not to implement the wipe operation mode selection based on the average amount of landed raindrops, wherein the wipe operation mode selection means selects the wipe operation mode based on the average amount of landed raindrops when it is determined by the determination means that the wipe operation mode selection is implemented based on the average amount of landed raindrops and the wipe operation mode selection means selects the wipe operation mode based on any one of the amount of landed raindrops and the vehicle acceleration when it is not determined that the wipe operation mode selection based on the average amount of landed raindrops is implemented.

2. The wiper control system according to claim 1, wherein the determination means includes provisional wipe operation mode selection means for selecting a provisional wipe operation mode based on the amount of landed raindrops, the wipe operation mode selection means selects the provisional wipe operation mode as the wipe operation mode when the determination means does not determine the implementation of the wipe operation mode selection based on the average amount of landed raindrops.

3. The wiper control system according to claim 1, wherein the determination means includes:

acceleration criterion value setting means for setting an acceleration criterion value for determining the degree of acceleration or deceleration of the vehicle; and comparison means for comparing the vehicle acceleration with the acceleration criterion value, wherein the acceleration criterion value setting means varies the acceleration criterion value in accordance with the vehicle speed.

4. The wiper control system according to claim 3, further comprising:
   vehicle speed zone setting means for dividing the range of vehicle speed, at which the vehicle can run, into a plurality of zones, wherein
   the acceleration criterion value setting means includes upper acceleration limit criterion value setting means for determining whether the vehicle accelerates or not for each zone,
   the plurality of zones are classified at least into an extremely low speed zone in which the vehicle speed is extremely low including a stop of the vehicle and the other zones except for the extremely low speed zone, and
   an upper acceleration limit criterion value in the extremely low speed zone is set lower than those in the other zones.

5. The wiper control system according to claim 3, further comprising:
   vehicle speed zone setting means for dividing the range of vehicle speed, at which the vehicle can run, into a plurality of zones, wherein
   the acceleration criterion value setting means includes lower acceleration limit criterion value setting means for determining for each of the zones whether the vehicle decelerates or not so that the lower acceleration limit criterion value is set lower in a zone with a higher vehicle speed.

6. A wiper control system for detecting an amount of raindrops landed on a windshield of a vehicle and driving a wipe operation of a wiper to wipe the landed raindrops, the wiper control system comprising:
   raindrop sensing means capable of detecting the amount of landed raindrops for each of a plurality of wipe cycles of the wiper;
   average landed raindrop amount calculation means for calculating an average value of the amount of landed raindrops for the plurality of wipe cycles;
   vehicle acceleration sensing means for determining an acceleration of the vehicle;
   wipe operation mode selection means for selecting a wipe operation mode, wherein the wipe operation mode selection means selects the wipe operation mode of the wiper based on the acceleration of the vehicle and one of the amount of landed raindrops and the average amount of landed raindrops; and
   wherein the wipe operation mode selection means selects the wipe operation mode based on a change between an earlier average amount of landed raindrops and a later average amount of landed raindrops calculated in the order of wipe cycles in the case where the wipe operation mode is selected based on the average amount of landed raindrops.

7. A wiper control system for detecting an amount of raindrops landed on a windshield of a vehicle and driving a wipe operation of a wiper to wipe the landed raindrops, the wiper control system comprising:
   raindrop sensing means capable of detecting the amount of landed raindrops for each of a plurality of wipe cycles of the wiper;
   average landed raindrop amount calculation means for calculating an average value of the amount of landed raindrops for the plurality of wipe cycles;
   vehicle acceleration sensing means for determining an acceleration of the vehicle;
   wipe operation mode selection means for selecting a wipe operation mode, wherein the wipe operation mode selection means selects the wipe operation mode of the wiper based on the acceleration of the vehicle and one of the amount of landed raindrops and the average amount of landed raindrops; and
   wherein the average landed raindrop amount calculation means includes: storage means for storing the amounts of landed raindrops in the order of wipe cycles; and sample number setting means for setting the number of samples as a parameter for averaging the amounts of landed raindrops, wherein an average amount of landed raindrops is calculated from the latest amount of landed raindrops detected based on the number of samples and the previous amounts of landed raindrops except for the latest amount of landed raindrops.

8. The wiper control system according to claim 7, further comprising:
   change criterion value setting means for setting a criterion value to be compared with a change in the average amount of landed raindrops for selecting the wipe operation mode; and
   acquisition means for acquiring switching information for switching to a change criterion value required by the driver, wherein
   the change criterion value setting means changes the change criterion value based on any one of the switching information and the vehicle speed.

9. A wiper control method for detecting an amount of raindrops landed on a windshield of a vehicle and driving a wipe operation of a wiper to wipe the landed raindrops, the wiper control method comprising:
   detecting the amount of landed raindrops for each of the plurality of wipe cycles of the wiper;
   calculating an average value of the amount of landed raindrops for the plurality of wipe cycles;
   determining an acceleration of the vehicle;
   selecting a wipe operation mode, wherein selection of the wipe operation mode of the wiper is based on the acceleration of the vehicle and one of the amount of landed raindrops and the average amount of landed raindrops; and
   determining based on the vehicle acceleration whether or not to implement the wipe operation mode selection based on the average amount of landed raindrops;
   wherein the wipe operation mode is selected based on the average amount of landed raindrops when it is determined that the wipe operation mode selection is implemented based on the average amount of landed raindrops and the wipe operation mode is selected based on any one of the amount of landed raindrops and the vehicle acceleration when it is not determined that the wipe operation mode selection based on the average amount of landed raindrops is implemented.

10. The method according to claim 9, wherein
    determining whether or not to implement the wipe operation mode selection includes selecting a provisional wipe operation mode based on the amount of landed raindrops, wherein
    the provisional wipe operation mode is selected as the wipe operation mode when the implementation of the wipe operation mode selection based on the average amount of landed raindrops is not determined.

11. The method according to claim 9, wherein
    determining whether or not to implement the wipe operation mode selection includes:
    setting an acceleration criterion value for determining the degree of acceleration or deceleration of the vehicle; and comparing the vehicle acceleration with the acceleration criterion value, wherein the acceleration criterion value is varied accordance with the vehicle speed.

12. The method according to claim 11, further comprising:
dividing the range of vehicle speed, at which the vehicle can run, into a plurality of zones, wherein setting the acceleration criterion value includes determining whether the vehicle accelerates or not for each zone,
the plurality of zones are classified at least into an extremely low speed zone in which the vehicle speed is extremely low including a stop of the vehicle and the other zones except for the extremely low speed zone, and
an upper acceleration limit criterion value in the extremely low speed zone is set lower than those in the other zones.

13. The method according to claim 11, further comprising:
dividing the range of vehicle speed, at which the vehicle can run, into a plurality of zones, wherein setting the acceleration criterion value includes determining for each of the zones whether the vehicle decelerates or not so that a lower acceleration limit criterion value is set lower in a zone with a higher vehicle speed.

14. A wiper control method for detecting an amount of raindrops landed on a windshield of a vehicle and driving a wipe operation of a wiper to wipe the landed raindrops, the wiper control method comprising:
detecting the amount of landed raindrops for each of a plurality of wipe cycles of the wiper;
calculating an average value of the amount of landed raindrops for the plurality of wipe cycles;
determining an acceleration of the vehicle; and
selecting a wipe operation mode, wherein selection of the wipe operation mode of the wiper is based on the acceleration of the vehicle and one of the amount of landed raindrops and the average amount of landed raindrops; and
wherein the wipe operation mode is selected based on a change between an earlier average amount of landed raindrops and a later average amount of landed raindrops calculated in the order of wipe cycles in the case where the wipe operation mode is selected based on the average amount of landed raindrops.

15. A wiper control method for detecting an amount of raindrops landed on a windshield of a vehicle and driving a wipe operation of a wiper to wipe the landed raindrops, the wiper control method comprising:
detecting the amount of landed raindrops for each of the plurality of wipe cycles of the wiper;
calculating an average value of the amount of landed raindrops for the plurality of wipe cycles;
determining an acceleration of the vehicle;
selecting a wipe operation mode, wherein selection of the wipe operation mode of the wiper is based on the acceleration of the vehicle and one of the amount of landed raindrops and the average amount of landed raindrops; and
wherein calculating the average value of the amount of landed raindrops for the plurality of wipe cycles includes storing the amounts of landed raindrops in the order of wipe cycles; and
setting the number of samples as a parameter for averaging the amounts of landed raindrops, wherein an average amount of landed raindrops is calculated from the latest amount of landed raindrops detected based on the number of samples and the previous amounts of landed raindrops except for the latest amount of landed raindrops.

16. The method according to claim 15, further comprising:
setting a criterion value to be compared with a change in the average amount of landed raindrops for selecting the wipe operation mode; and
acquiring switching information for switching to a change criterion value required by the driver, wherein
the change criterion value is changed based on any one of the switching information and the vehicle speed.

* * * * *